United States Patent [19]
Medl

[11] Patent Number: 6,108,004
[45] Date of Patent: Aug. 22, 2000

[54] GUI GUIDE FOR DATA MINING

[75] Inventor: Robert E. Medl, San Jose, Calif.

[73] Assignee: International Business Machines Corporation, Armonk, N.Y.

[21] Appl. No.: 08/955,402

[22] Filed: Oct. 21, 1997

[51] Int. Cl.⁷ .............................. G06F 13/00; G06F 17/00
[52] U.S. Cl. .............................. 345/346; 706/46; 706/60; 707/102
[58] Field of Search .................................. 706/16, 12, 53, 706/59, 45, 46, 60, 1–9; 707/2, 3, 6, 7, 102, 501; 709/203; 345/340, 346, 347; 705/10, 11

[56] References Cited

U.S. PATENT DOCUMENTS 5,257,185  10/1993  Farley et al. ....................... 364/419.19
5,721,903  2/1998  Anand et al. ........................... 395/605
5,870,746  2/1999  Knutson et al. ........................ 707/101

OTHER PUBLICATIONS

"Data Mining with Clementine," WWW, 35 pgs. Sep. 1995.

Primary Examiner—Ba Huynh
Attorney, Agent, or Firm—Lacasse & Associates; Randy W. Lacasse; Ingrid Foerster

[57] ABSTRACT

A GUI is used to reduce the large task of creating data mining objects into a structured series of smaller steps. Generic headings for a sequence of GUI panels used in developing data mining objects are: Introduction (Welcome) panel; Selection of technique and settings name panel; Selection of a data source (when appropriate); Setting of general parameters (one or more panels); Output/results created and named for executable objects particular to the technique selected (depends on object selected); Naming the settings object and Finish page (completed). Each GUI panel intelligently leads the user through a series of low-level decisions. Each succeeding panel is chosen by the data input during the present panel. At completion, the user may review the series of GUI panels and selections and entries made to modify the resulting mining object. Once created, the objects are graphically ordered to create a sequence object which is then named and saved, thus preserving the sequence for future use.

30 Claims, 11 Drawing Sheets

GUI GUIDE FOR DATA MINING

RELATED MATERIALS AND DEFINITIONS

This application is related to the following co-pending applications:

METHOD FOR EDITING AN OBJECT WHEREIN STEPS FOR CREATING THE OBJECT ARE PRESERVED, Ser. No. 08/954,851; filed Oct. 21, 1997;

COLOR AND SYMBOL CODED VISUAL CUES FOR RELATING SCREEN MENU TO EXECUTED PROCESS, Ser. No. 08/954,851; filed Oct. 21, 1997; and POP-UP DEFINITIONS WITH HYPERLINKED TERMS WITHIN A NON-INTERNET PROGRAM, Ser. No. 08/954,850; filed Oct. 21, 1997.

BACKGROUND OF THE INVENTION

Portions of the disclosure of this patent document, in particular Appendix A, contain unpublished material which is subject to copyright protection. The copyright owner, International Business Machines Corporation, has no objection to the facsimile reproduction by anyone of the patent document or the patent disclosure, as it appears in the U.S. Patent and Trademark Office patent files or records, but otherwise reserves all rights whatsoever.

FIELD OF INVENTION

The present invention relates generally to the field of Data mining. More specifically, the present invention is related to a GUI to assist user development of data mining objects.

The following definitions may be useful to the understanding of the terminology as cited throughout the background, specification and claims of the present invention. Terms not specifically defined may be reviewed in available technical dictionaries, such as the *IBM Dictionary of Computing*, New York: McGraw-Hill, 1994. The terms "SmartGuide", "Guide", "Intelligent Guide" or "GUI Guide" or their plurals are considered equivalent and may be interchanged without modifying the scope or interpretation of the supporting text. In addition, the terms "panel", "template" or "page" or their plurals are considered equivalent.

Adaptive connection: A numeric weight used to describe the strength of the connection between two processing units in a neural network. The connection is called adaptive because it is adjusted during training. Values typically are in the range from zero to one, or −0.5 to +0.5.

AFS: A distributed file system developed by IBM and Carnegie-Mellon University.

Aggregate: To summarize data in a field.

Application Program Interface (API): A functional interface supplied by the operating system or a separately orderable licensed program that allows an application program written in a high-level language to use specific data or functions of the operating system or the licensed program.

Architecture: The number of processing units in the input, output and hidden layers of a neural network. The number of units in the input and output layers is calculated from the mining data and input parameters. An intelligent data mining agent calculates the number of hidden layers and the number of processing units in those hidden layers.

Associations: The relationship of items in a transaction in such a way that items imply the presence of other items in the same transaction.

Attribute: Characteristics or properties that can be controlled, usually to obtain a required appearance. For example, the color of a line. In object-oriented programming, a data element defined within a class. Same as instance variable.

Back Propagation: A general purpose neural network model named for the method used to adjust its weights while learning data patterns. This model is used by the Neural Classification mining function.

Boundary Field: In the range data source used in the discretization using ranges processing function, the upper limit of an interval.

Bucket: A planning period. A bucket may be any group of time, such as a day, week, month, quarter, semi-annual period, year or number of years. Buckets may vary in size according to the function performing the planning.

Categorical Values: Discrete, non-numerical data represented by character strings, for example, colors or special brands.

Class: In object-oriented design or programming, a group of objects that share a common definition and that therefore share common properties, operations and behavior. Members of the group are called instances of the class. A collection of defined entities (users, groups and resources) with similar characteristics. Any category to which things are assigned or defined. The specification of an object, including its attributes and behaviors.

Classification: The assignment of objects in groups or categories based on their characteristics.

Cluster: A group of records that have similar characteristics.

Cluster Prototype: The attribute values that are typical of all records in a given cluster. Used to compare the input records to determine if a record should be assigned to the cluster represented by these values.

Clustering: To partition a database into groups of records that have similar characteristics. A cluster profile represents the typical values of the fields for records in their assigned cluster.

Confidence Factor: Indicates the strength or the reliability of the associations detected.

Continuous Field: A field in which, given any two unequal values, there exists a value that falls between the two.

Control: In SAA Advanced Common User Access architecture, a component of the user interface that allows a user to select choices or type information; for example, a check box, an entry field, a radio button.

DATABASE2 (DB2): An IBM relational database management system.

Database View: An alternative representation of data from one or more data tables. A view can include all or some of the columns contained in the data table or data tables on which it is defined.

Data Field: In a data table, the intersection from table description and table column where the corresponding data is entered.

Data Format: There are different kinds of data formats, for example, database tables, database views or flat-file tables.

Data Table: A data table, regardless of the data format it contains.

Data Type: There are different kinds of data types, for example, categorical, integer or discrete.

DBCS: A set of characters in which each character is represented by two bytes. See also Double-byte Character Set.

Discrete: Pertaining to data that consists of distinct elements, such as characters or to physical quantities having a finite number of distinctly recognizable values.

Discretization: The act of making mathematically discrete.

Distributed File System: A file system composed of files or directories that physically reside on more than one computer in a communication network.

Equality Compatible: Pertaining to different data types that can be operands for the=logical operator.

Euclidean Distance: The square root of the sum of the squared pairwise differences between two numeric vectors. The Euclidean distance is used to calculate the error between the calculated network output and the target output in Neural classification.

Field: A set of one or more related data items grouped for processing. In this document, with regard to database tables and views, field is synonymous to column.

File-selection Box: A box that enables the user to choose a file to work with by it selecting a file name from the ones listed or by typing a file name into the space provided.

File Specification (filespec): In the AIX operating system, the name and location of a file. A file specification consists of a drive specifier, path name and file name.

File System: In the AIX operating system, the collection of files and file management structures on a physical or logical mass storage device, such as a diskette or minidisk. See also Distributed File System, Virtual File System.

Flat-File Table: (1) A one-dimensional or two-dimensional array: a list or table of items. (2) A file that has no hierarchical structure residing in a simple file.

Formatted Information: An arrangement of information into discrete units and structures in a manner that facilitates its access and processing. Contrast with narrative information.

Fuzzy Logic: In artificial intelligence, a technique using approximate rules of inference in which truth values and quantifiers are defined as possibility distributions that carry linguistic labels.

Hidden Layers: A set of processing units in a neural network used to calculate its outputs. Hidden layer processing units take their inputs from the preceding hidden layer units, or from the input layer. Their outputs are passed to either a succeeding hidden layer or the network's output layer. The number of hidden layers and the number of processing units in each hidden layer is part of the network architecture.

Index: In SQL, pointers that are logically arranged by the values of a key. Indexes provide quick access and can enforce uniqueness on the rows in a table.

Input Data: Data that is entered into a data processing system or any of its parts for storage or processing. Data received or to be received by a functional unit or by any part of a functional unit. Data to be processed. Pertaining to Intelligent Miner, the meta-data of the database table, database view or flat-file table containing the data you specified to be mined.

Input Layer: A set of processing units in a neural network which present the numeric values derived from user data to the network. The number of fields and type of data in those fields is used to calculate the number of processing units in the input layer.

Instance: In object-oriented programming, a single, actual occurrence of a particular object. Any level of the object class hierarchy can have instances. An instance can be considered in terms of a copy of the object type frame that is filled with particular information.

Interval Boundaries: Values that represent the upper and lower limits of an interval.

Item Category: A categorization of an item. For example, a room in a hotel can have the following categories: Standard, Comfort, Superior, Luxury. The lowest category is called child item category. Each child item category can have several parent item categories. Each parent item category can have several grandparent item categories.

Item Set: A collection of items. For example, all items bought by one customer during one visit to a department store.

Key: In SQL, a column or an ordered collection of columns identified in the description of an index.

Kohonen Feature Map: A neural network model comprised of processing units arranged in an input layer and output layer. All processors in the input layer are connected to each processor in the output layer by an adaptive connection. The learning algorithm used involves competition between units for each input pattern and the declaration of a winning unit. Used in Neural clustering to partition data into similar record groups.

Large Item Sets: The total volume of items above the specified support factor returned by the association data-mining function.

Learning Algorithm: The set of well-defined rules used during the training process to adjust the connection weights of a neural network. The criteria and methods used to adjust the weights define the different learning algorithms.

Learning Parameters: The variables used by each neural network model to control the training of a neural network which is accomplished by modifying network weights.

Lift: Confidence factor divided by expected confidence.

Meta-data: In databases, data that describes data objects.

Mining: Synonym for analyzing, searching.

Mining Base: A repository where all the information about the input data, the mining run settings, and the corresponding results is stored.

Mining Run Setting: Contains the different parameters defined for a mining run.

Model: A specific type of neural network and its associated learning algorithm. Examples include: Kohonen Feature Map and back propagation.

Name Mapping: A table containing descriptive names or translations of other languages mapped to the numerals or the character strings of a data table.

Named Pipe: A named buffer that provides client-to-server, server-to-client, or full duplex communication between unrelated processes.

Neural Network: A plurality of connections between computer processing elements, wherein the organization and weights of the connections determine the output.

Neural Network Utility (NNU): A family of IBM application development products for creating neural network and fuzzy rule system applications.

Output Data: Data that a data processing system or any of its parts transfers outside of that system or part. Data being produced or to be produced by a device or a computer program. Data delivered or to be delivered from a functional unit or from any part of a functional unit. Pertaining to the Intelligent Miner, the meta data of the database table, database view, or flat-file table containing the data being produced or to be produced by a function.

Output Layer: A set of processing units in a neural network which contain the output calculated by the network.

The number of outputs depends on the number of classification categories or maximum clusters value in Neural classification and Neural clustering, respectively.

Pass: The number of records in a training data source presented before the weights in a neural network are update, typically the number of records in the file.

Pipe: A named or unnamed buffer used to pass data between processes.

Predicting Values: The dependency and the variation of one field's value within a record on the other fields within the same record. A profile is then generated that can predict a value for the particular field in a new record of the same form, based on its other field values.

Processing Unit: A processing unit in a neural network is used to calculate an output value by summing all incoming values multiplied by their respective adaptive connection weights.

Quantile: One of a finite number of non-overlapping subranges or intervals, each of which is represented by an assigned value.

Radial Basis Function: In the data-mining functions, radial basis functions are used to predict values. They represent functions of the distance or the radius from a particular point. They are used to build up approximations to more complicated functions.

Record: A set of one or more related data items grouped for processing. In reference to a database table, record is synonymous to row.

Root: In the AIX operating system, the user name for the system user with the most authority.

Rule: A clause in the form head &ldarrow.body. It specifies that the head is true if the body is true.

Rule Body: Represents the premise, the specified input data for a mining function.

Rule Group: Covers all rules containing the same items in different variations.

Rule Head: Represents the derived items detected by the associations data-mining function.

SAA: The Common User Access architecture, the Common Programming Interface, and the Common Communications Support.

Schema: A logical grouping for database objects. When a database object is created, it is assigned to one schema, which is determined by the name of the object. For example, the following command creates table X in schema G: CREATE TABLE C.X Self-organizing Feature Map: See Kohonen Feature Map.

Sensitivity Analysis Report: An output from the Neural Classification mining function that shows which input fields are relevant to the classification decision. Sequential Patterns: Intertransaction patterns such that the presence of one set of items is followed by another set of items in a database of transactions over a period of time.

Similar Time Sequences: Occurrences of similar sequences in a database of time sequences.

Structured Query Language (SQL): An established set of statements used to manage information stored in a database. By using these statements, users can add, delete or update information in a table, request information through a query, and display the results in a report.

Supervised Learning: A learning algorithm that requires input and resulting output pairs to be presented to the network during the training process. Back propagation, for example, uses supervised learning and makes adjustments during training so that the value computed by the neural network will approach the actual value as the network learns from the data presented. Supervised learning is used in the techniques provided for predicting classification, as well as for predicting values.

Support Factor: Indicates the occurrence of the detected association rules and sequential patterns based on the input data.

Swapping: A process that interchanges the contents of an area of real storage with the contents of an area in auxiliary storage.

Symbolic Name: In a programming language, a unique name used to represent an entity such as a field, file, data structure or label. In Intelligent Miner, you specify symbolic names, for example, for input data, name mappings or taxonomies.

Taxonomy: Represents a hierarchy or a lattice of associations between the item categories of an item. These associations are called taxonomy relations.

Taxonomy Relation: The hierarchical associations between the item categories you defined for an item. A taxonomy relation consists of a child item category and a parent item category.

Trained Network: A neural network containing connection weights that have been adjusted by a learning algorithm. A trained network can be considered a virtual processor; it transforms inputs to outputs.

Training: The process of developing a model which understands the input data. In neural networks, the model is created by reading the records of the input data and modifying the network weights until the network calculates the desired output data.

Translation Process: Converting the data provided in the database to scaled numeric values in the appropriate range for a mining kernel using neural networks. Different techniques are used depending on whether the data is numeric or symbolic. Also, converting neural network output back to the units used in the database.

Transaction: A set of items or events that are linked by a common key value, for example, the articles (items) bought by a customer (customer number) on a particular data (transaction identifier). In this example, the customer number represents the key value.

Transaction ID: The identifier for a transaction, for example, the date of a transaction.

Transaction Group: The identifier for a set of transactions. For example, a customer number represents a transaction group. It includes all purchases of a particular customer during the month of May.

Unsupervised Learning: A learning algorithm that requires only input data to be present in the data source during the training process. No target output is provided; instead, the desired output is discovered during the mining run. Kohonen Feature Map, for example, uses unsupervised learning.

Weight: The numeric value of an adaptive connection representing the strength of the connection between two processing units in a neural network.

Winner: The index of the cluster which has the minimum Euclidean distance from the input record. Used in the Kohonen Feature Map to determine which output units will have their weights adjusted.

1. Background

Data mining is defined as the recognition of previously unknown or unrecognized patterns within data. Prior art Data Mining techniques typically extract patterns found in large quantities of data (i.e., in the Giga-byte range). Data mining techniques may be used to analyze a company's quarterly results using its financial data as the subject data. Data mining algorithms are used, based on user defined profiles, to recognize patterns such as profit, efficiency and inventory. In addition, time sequence pattern recognition may provide useful information for forecasting future liabilities, personnel requirements and scheduling of product deliveries. Data mining techniques are used in the scientific community to analyze test or sensor data to determine patterns useful in developing medical applications, reliability standards or other machinery operational parameters, etc. To date, only a very limited number of data mining algorithms have been developed, the three most common ones being:

1. Associations—determining associations between selected fields.
2. Clustering—reviewing large amounts of data (Giga-byte range) and extracting large portions of data with similar characteristics. This algorithm may be repeating for multiple clusters.
3. Time Sequences—historical data determining a series of trends that always occur in a particular time sequence (e.g., every four weeks). This algorithm is used to predict future behavior.

At the present time, IBM has developed eight data mining algorithms, including the above three, plus support functions (Statistical processing). The specific mining algorithms, however, are not essential to the proper understanding of the GUI of the present invention. It is envisioned that any present and future mining algorithms can be used within the present invention.

2. Discussion of Prior Art

The Intelligent Miner version 1.0—GUI, by International Business Machines (generally available through IBM Branches) is the predecessor to the present invention. The GUI of this version is implemented as a single interface requiring the intelligent manipulation and selection of parameters directly by the user.

A data mining package "Clementine", by Integral Solutions, and generally available by contacting http:\\WWW.ISL.CO.UK\TOPCLEM.HTML provides for a data mining GUI using a graphical icon approach, but fails to provide guided assistance to the user to develop a data mining profile.

The overwhelming restriction on the implementation of data mining is the requirement of Ph.D.-level diagnostics (mathematics, statistics) to fully develop appropriate mining profiles. As the data mining industry expands, it becomes imperative to reduce the intelligence requirement to enable users less familiar with the mathematics and statistical aspects of mining to have access to valuable results created by data mining.

In the past, the enormous numbers of variables/input parameters needing intelligent management was overwhelming. The intelligence requirement was satisfied by the highly developed knowledge of the user and provided to the system through a single panel, specifying all possible parameters available for tweaking (Developers GUI). What is needed is a GUI guiding the less knowledgeable user through a series of simpler steps to develop the data mining profiles.

Whatever the precise merits, features and advantages of the above cited references, none of them achieves or fulfills the purposes of the present invention. Accordingly, it is an object of the present invention to provide for a plurality of steps which take the user through low-level decision making processes to define data mining objects. Each step presents a small number of possible choices with assistance, intelligently leading a user through the entering of parameters appropriate for the user's desired mining goals, while restricting access to choices not necessary to accomplish these goals.

It is another object of the present invention to provide an interface consistent with well known Windows® environment GUIs.

It is an additional object of the present invention to provide a sequence object which strings together various data mining objects to create a data mining profile.

It is an additional object of the present invention to provide a single interface displaying a summary of data mining object parameters.

These and other objects are achieved by the detailed description that follows.

SUMMARY OF THE INVENTION

The present invention improves on the prior art and eliminates many problems associated with the prior art including, but not limited to, those previously discussed above.

A GUI guide is a mechanism by which the large task of creating data mining objects is broken into smaller steps. The following list provides generic headings for a sequence of GUI panels used in developing data mining objects according to the present invention:

Introduction (Welcome) panel

Selection of technique and settings name panel

Selection of a data source (when appropriate)

Setting of general parameters particular to the selected technique (one or more panels)

Specifying fields for the output data (when appropriate)

Specifying the name for the output data (when appropriate)

Specifying the name of the result object( when appropriate)

Summary page (completed)

The GUI method of the present invention is used to reduce the large task of creating data mining objects into one of a structured series of smaller steps. The generic headings for the sequence of GUI panels used in developing data mining objects listed above are modified to intelligently lead a user through a series of low level decisions. Each succeeding panel is chosen by the data input during the previous panel. At completion, the user may review the series of GUI panels for selections and entries made to modify the resulting mining object.

DESCRIPTION OF THE PREFERRED EMBODIMENTS

Figure 1:
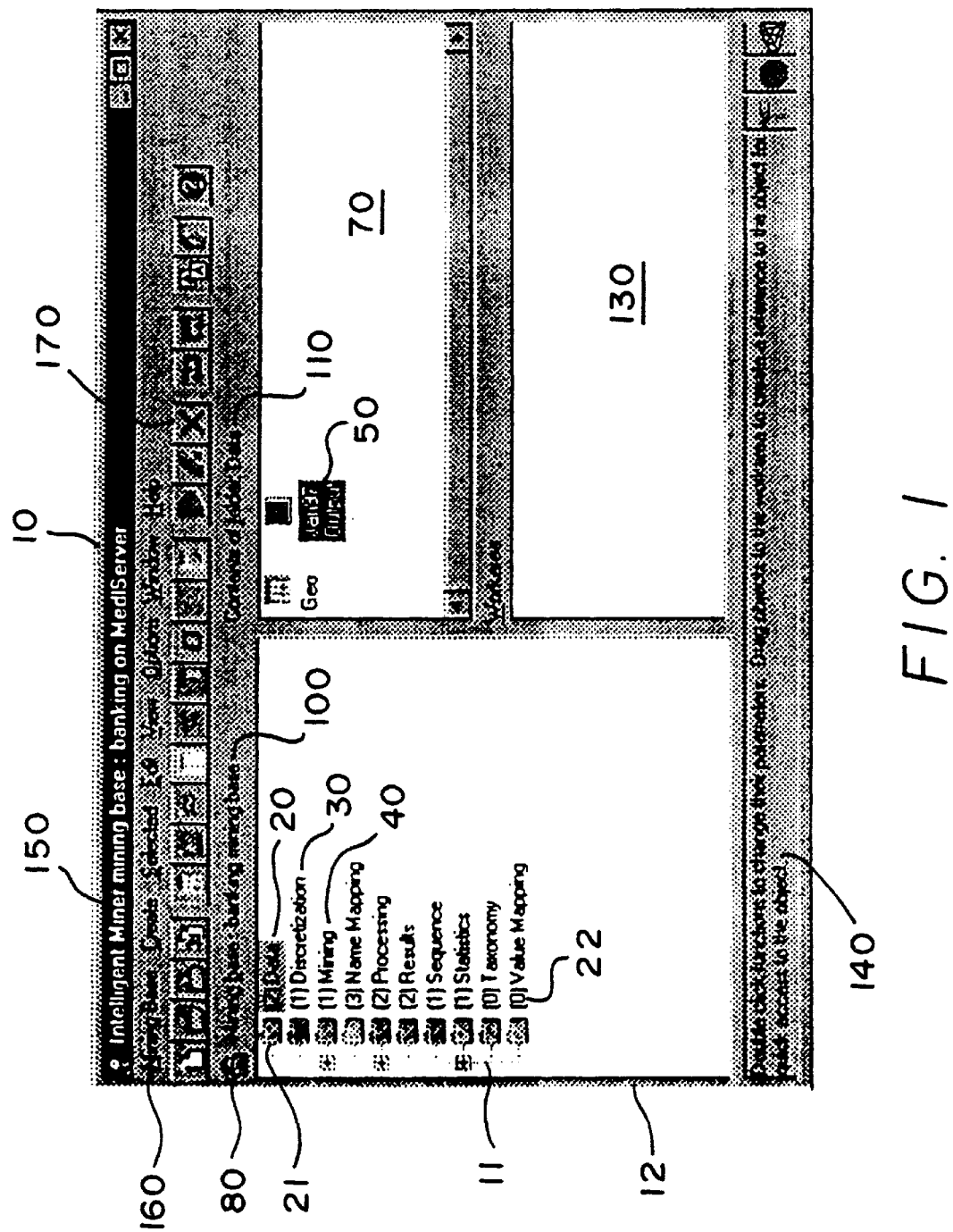
FIG. 1 illustrates a window showing a main window illustrating a directory listing of data mining objects and sub-objects.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

The main window of the present invention, illustrated in FIG. 1, is the window that appears when the Intelligent Miner V2.0 client is started and after the user has logged on to the server on which Intelligent Miner is running (see Appendix A-4.5 Miscellaneous: Preferences notebook for details on servers, userids, passwords, and stand-alone mode). FIG. 1 illustrates a main panel 10 which includes a tree breakout 11 of various data mining objects 20, 30 and 40. The tree styled display of objects is very common and is not unlike that found in the Windows®95 Explorer system. Each data mining object 20, 30 and 40 includes a folder 21, numeric indicator 22 of the number of sub-objects located therein and the name 20, etc., given to the particular object. Objects are typically directory or file names, but are not limited thereto. In the preferred embodiment, the data mining objects 20, 30 and 40 represent data mining objects used to develop a data mining profile.

A general overview of the main window is as follows:

A dynamic title bar 150 which is changed based on the name of the currently open mining base; it also reflects the name of the server on which the mining base resides.

A menu bar 160 which contains menu items providing access to a variety of Intelligent Miner functions.

A customizable toolbar 170 which provides access to commonly used Intelligent Miner functions.

A Mining Base container 12 which displays the structure of the objects 20, 30, 40 in the mining base. The Mining Base container includes the left side of the main window and label above the container, as shown in FIG. 1. An icon of a closed or open padlock 80 is placed above the container to indicate if the user is in read-only or read/write mode, respectively. In FIG. 1, the user is in the read/write mode. The label 100 above the container 12 reads as follows: Mining base: [untitled] when no mining base is opened, or when the mining base has not been saved and named. The label reads mining base: <mining base name>, where <mining base name> is the name of the mining base, when a mining base has been opened. For example, in the screen capture of FIG. 1, the mining base banking mining base is open. The container is comprised of entries which include a uniquely color-coded folder 21, a number in parentheses 22, denoting the number of mining base objects in that folder, and a text description 20, 30, 40 describing the type of mining base objects in that folder. The exception to this is the Mining, Processing and Statistics folders, where the number in parentheses denotes the total number of mining base objects contained in its child folders. The container, by default, does not have any of the Mining, Processing or Statistics folders expanded. Selection in the container is 1-based; by default, the Data folder is selected. Single selection is supported.

Any folder in the tree view can be selected, causing the objects in that folder (or child folders for the Mining, Processing and Statistics folders) to be displayed in the Contents container 70 and the label of the Contents container 110 to change to contents of folder: <folder description>, where <folder description> is the text description associated with the selected entry. The user cannot change the order of the entries, the text descriptions of the entries, or the color-coded folder graphics of the entries. The user cannot add or remove entries from the container.

Also, the Mining, Processing and Statistics folders in the Mining Base container contain child folders (not illustrated-see Appendix A, section 1.3)—one for each function type in each category. For instance, the Mining folder contains child folders Discover associations, Discover clusters, Discover sequential patterns, Discover similar time sequences, Predict Classifications and Predict Value.

A Contents container 70 displays the contents of the folder selected in the Mining Base container. The Contents container 70 refers to the top, right-side of the main window, including the label above the container, as in shown in FIG. 1. The label above the container reads as follows: Contents of folder: <folder description>, where <folder description> is the text description associated with the selected entry in the Mining Base container. The container itself is a customizable view (can be Large Icons, Small Icons, List or Details view) of the selected entry in the Mining Base container. When the selected entry in the Mining Base container is a folder other than the Mining, Processing or Statistics folders, the Contents container has the following characteristics:

The container contains one object for each mining base object in the selected Mining Base container folder.

Double clicking on an object causes its settings notebook to open (in the case where the object is a non-Result object) or the first visualizer in the (client-side) list of visualizer associated with the result type to open with the result loaded (in the case where the object is a Result object).

Selection in the container is 0-based; by default, no object is selected. Multiple selection is supported.

Any object in the view can be selected and actions appropriate for that object are reflected in the enabling and disabling of menu choices and toolbar buttons.

Context menus are provided for both the objects and the container itself. The context menu contains only those choices appropriate for the current selection.

When the selected entry in the Mining Base container is the Mining, Processing or Statistics folder, the Contents container has the following characteristics:

The container contains one folder for each child folder of the selected folder. Double clicking on a folder in the Contents container invokes the same behavior as selecting the folder in the Mining Base container, i.e. the folder is given selection emphasis in the Mining Base container and its contents are displayed in the Contents container. Selection in the container is 0-based; by default, no object is selected. Multiple selection is not supported.

The Workarea container 130 is a customizable view (can be Large Icons, Small Icons, List or Details view) of references to the objects that the user has dragged and dropped from the Contents container. The container contains one object for each mining base object reference that the user has placed here. Selection in the container is 0-based; by default, no object is selected. Multiple selection is supported. The workarea entries are saved at the client when the mining base is saved from the client. If, when the user re-opens the mining base from the same client entries that were in the workarea have been deleted, the user is informed via a message that entries have been deleted, which entries were deleted, and the workarea is populated with the entries that still exist in the mining base. If an object is dragged from the Contents container to the Workarea container, and a reference of the object already exists in the Workarea, the 'no-drop' cursor is displayed indicating that the action is not permitted. Also, see the discussion relating to Edit|Paste and Edit|Paste Shadow. The graphics associated with this container are the same as those associated with the Contents container.

A dynamic information area 140 displays helpful information about the GUI based on the location of the mouse; it also displays one icon for each currently running setting and one for each setting that has completed running. The information area 140 of the main window is located at the bottom of and spans the width of the main window, and is strictly read-only. It contains text that provides assistance to the user. When a mining base is first opened, and the user is in read/write mode, and there are currently running or as-yet unconfirmed failed or successful mining runs associated with the mining base, one graphic for each of these types of mining runs is shown in the information area. The progress indicators are not shown for these types of mining runs until the user double clicks on a graphic in the information area.

A font and color scheme that reflects the client's system settings for font and colors.

The menu bar 160 is an area near the top of the main window, just below the title bar 150 and above the rest of the window, that contains routing choices that provide access to pull down menus. The menu item is changed to Paste Shadow when the Workarea has focus and there is a mining base object in the clipboard.

The title bar 150 of the main window is Intelligent Miner mining base: [untitled] on <IMServerName>, where <IMServerName> is the name of the Intelligent Miner server to which the client is currently connected. The user is presented with a window which lists existing mining bases from which the user can choose one to open. If changes have been made to the current mining base since it was last saved, the user is asked to confirm this action. The confirmation will allow the user to save the current mining base and open a new one, do not save the mining base and open a new one, or cancel the action entirely. (If there are settings object currently running at the server when the user selects this menu choice, the user is given the option of saving the current mining base and opening a new one, or canceling the action. The user is not given the option of not saving the mining base and opening a new one.) If no changes have been made to the current mining base since it was last saved, and there are no settings object currently running at the server, the current mining base is closed and a new, empty mining base is created.

In the preferred embodiment, the title bar 150 of the main window is Intelligent Miner mining base: <Mining Base Name> on <IMServerName>, where <Mining Base Name> is replaced by the name of the mining base and <IMServerName> is the name of the Intelligent Miner server to which the client is currently connected.

Selections in the Mining Base container are 1-based and do not support multiple selection; this means that one and only one item MUST be selected and the selected folder is indicated even when the Mining Base container does not have focus. See the screen captures in Appendix A which illustrate how selection is indicated in the Mining Base container when the Mining Base container has focus vs. when it does not: Also, note that, except when child folders are displayed in the Contents window, selection in the Contents and Workarea containers is 0-based, supports multiple selection, and is indicated only when the container has focus (in fact, there is no concept of selection when the container does not have focus). Finally, note that the Contents container contains a homogeneous set of objects, while the Workarea container may contain a heterogeneous set of objects.

When a heterogeneous group of objects is selected, the context menu is the intersection of the menu items that would appear if each item were to be selected individually. For example, if a Result and a Mining object were selected, the Selected menu would be Open, (Separator), Remove, Delete, Rename . . . . If more than one object is selected and the Run menu choice or toolbar button is selected, multiple asynchronous jobs are started for those objects that are runnable, i.e., non-Result objects, and multiple progress indicators are displayed.

If the selected item is a setting (i.e. not a Result or a sub-folder) and the item is opened using a menu choice or toolbar button, the tabbed settings notebook associated with that object is opened to the first page. If the selected mining base object is a Result object 60, and there is only one visualization tool installed on the client, the visualizer associated with the result type is opened and the selected Results object is loaded into the visualizer. If the selected mining base object is a Result object, and there is more than one visualization tool installed on the client, the menu choice reads Open with and leads to a cascaded menu listing the visualizers installed on the client from which the user can choose. Then, the result is opened and the selected Results object is loaded into the selected visualizer.

If the selected item is a sub-folder of Mining, Processing or Statistics, the Open choice opens the selected folder such that its contents are displayed in the Contents container 70 and the sub-folder 50 becomes selected in the Mining Base container.

The user may create any of the listed mining objects: Data 20, Discretization 30, Mining 40, Name Mapping, Processing, Sequence, Statistics, Taxonomy and Value Mapping (Result objects do not have a GUI guide, as they are created through the running of Mining or Statistics settings object.) For example, if the user selects create a new "data" object, the "Data" SmartGuide is opened; if the user selects create a new "discretization" object, the "Discretization" SmartGuide is opened, etc.

The specific contents of the selected menu are dynamic and depend primarily on the chosen container (Mining base, Contents, Workarea) in the main window which currently has focus, and secondarily on the currently selected object/folder in that container.

Opening a Smartguide initiates a sequence of intelligent GUI templates or panels to guide the user through a series of low level decisions until completion of the development of the selected data mining object. Each guide begins in essentially the same manner with a welcome window 200, FIG. 2. The generic window 200 includes a welcome message 210 and an outline of the development sequence for the particular type of object selected 220–250. Please note that different objects will navigate different paths through the series of GUI templates. FIGS. 2–8 will illustrate a sequence of templates to create a data object 20. Each of the remaining template paths are fully described in the attached Appendix A. What is essential to the present invention is the reduction in intelligence needed by the user to develop objects and further that the GUI templates are not static, but rather dynamic, based on a particular chosen decision while traversing the templates (e.g. parameter, technique, value, etc.)

Figure 2:
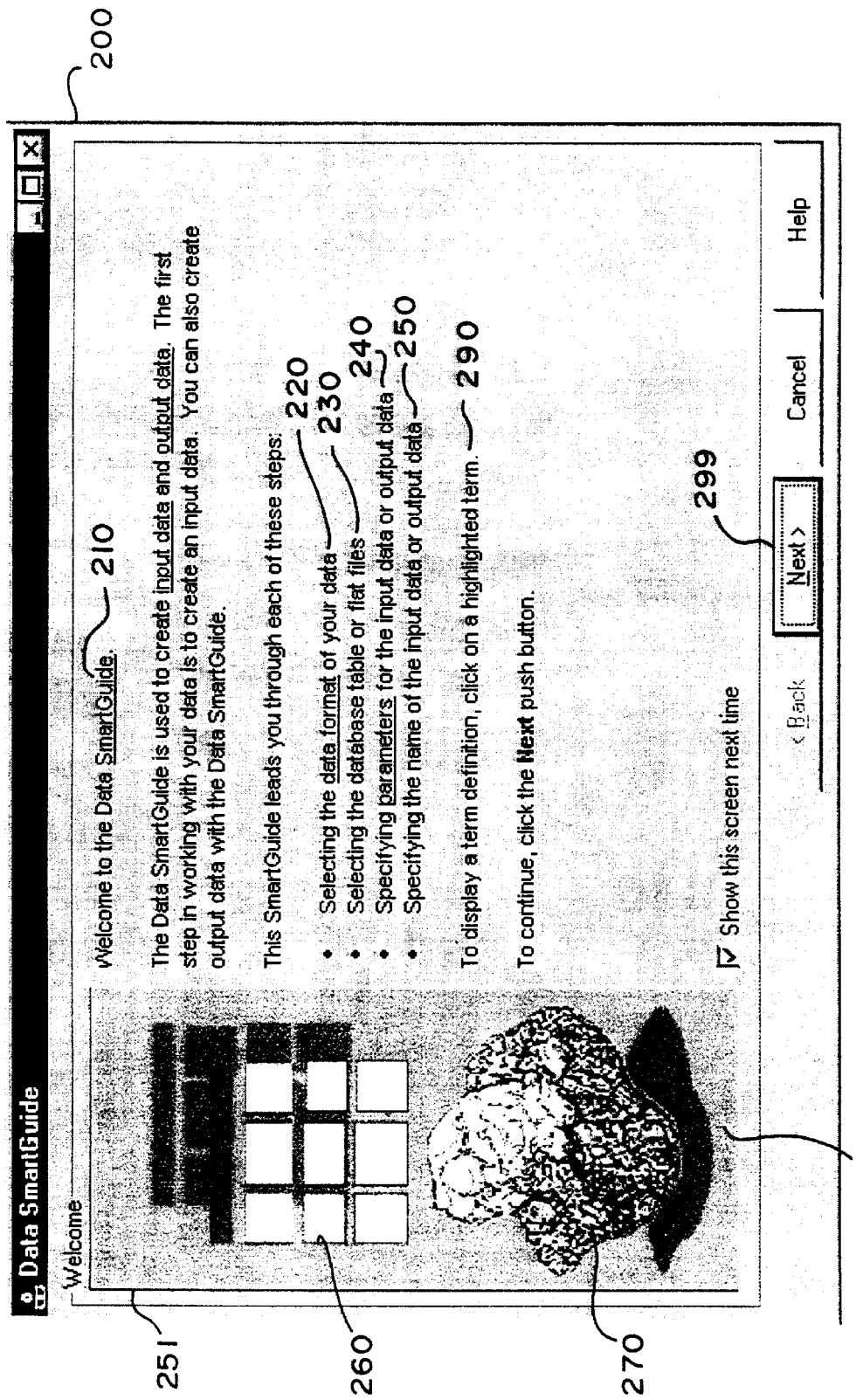
FIG. 2 illustrates a welcome page for a data mining object development system.

FIG. 2 includes a graphic 251 comprising: a background color 280 the same as the background color of folder 21 and object icon 50; a larger, more detailed image 260 of the object's icon 50 and a superimposed image, in the preferred embodiment, a rough nugget 270. A complete description of the elements and schema of graphic 251 may be found in the co-pending application entitled, "COLOR AND SYMBOL CODED VISUAL CUE FOR RELATING SCREEN MENU TO EXECUTED PROCESS." In addition, hypertext-based help is available to the user as suggested by line 290. A user may select any highlighted term (underlined for emphasis) to receive instant pop-up definitions and help screens. This help function is persistent throughout the GUI templates. A complete description of the hypertext help functions may be found in the co-pending application entitled, "POP-UP DEFINITIONS WITH HYPERLINKED TERMS WITHIN A NON-INTERNET PROGRAM." The next button 299 is always enabled and leads the user into the next template in the sequence of panels that should be displayed based on earlier user inputs.

Figure 3A:
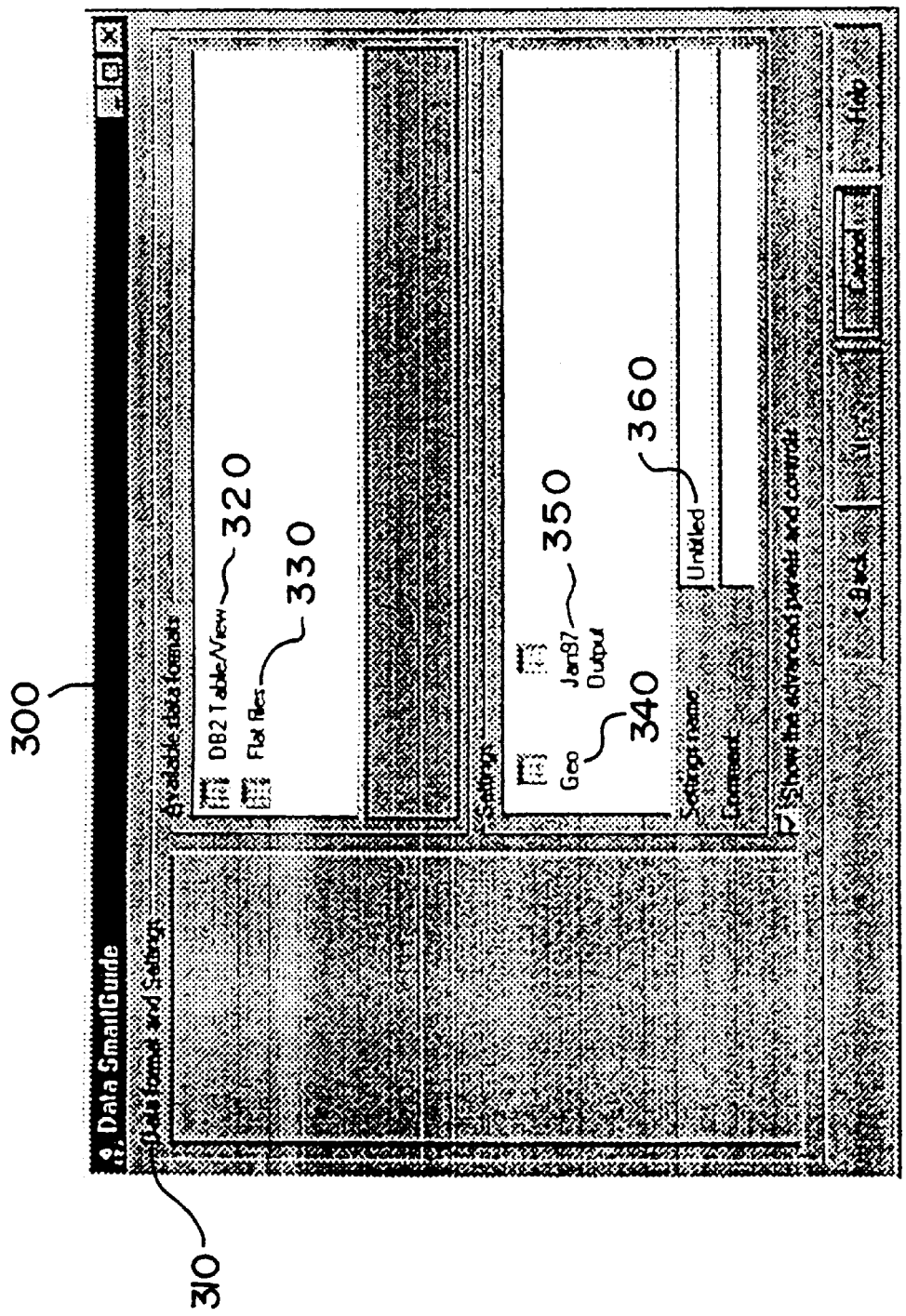
FIGS. 3a and 3b, collectively, illustrate format and settings and technique selection templates for developing data and discretization mining objects, respectively.

FIG. 3a illustrates a data GUI guide for selecting a particular data format and settings 300. The panel includes a listing of the available formats 320 (DB2 Table/View), 330 (Flat files). These are but examples of possible choices. Any existing or future file types may be selected. In addition, files of various formats may be imported from sources external to the user's system. Objects 340 and 350 represent previously designated data sub-objects. Element 360 notes a name of a selected settings sub-object.

Figure 3B:
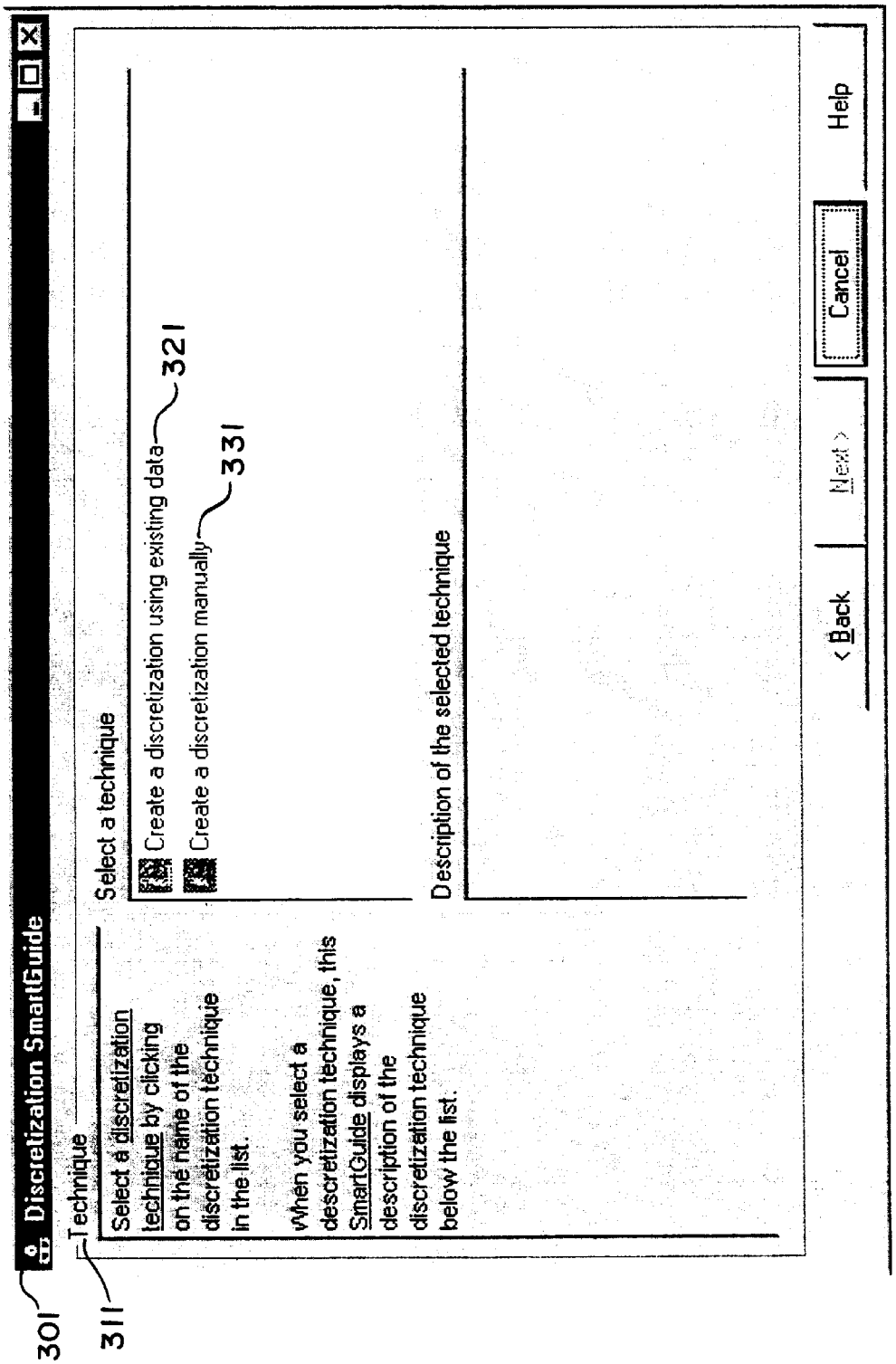

To illustrate the variations in template path presentation to the user based on active decisions, FIG. 3b has been included. FIG. 3b illustrates the variation encountered by the user when trying to create a discretization object. By selection of the create discretization object, a different second panel 301 is displayed. In this case, a user is given the option of selecting a technique 311 for object creation. Elements 321 and 331, respectively suggest creation using a data source or through manual input.

Figure 4:
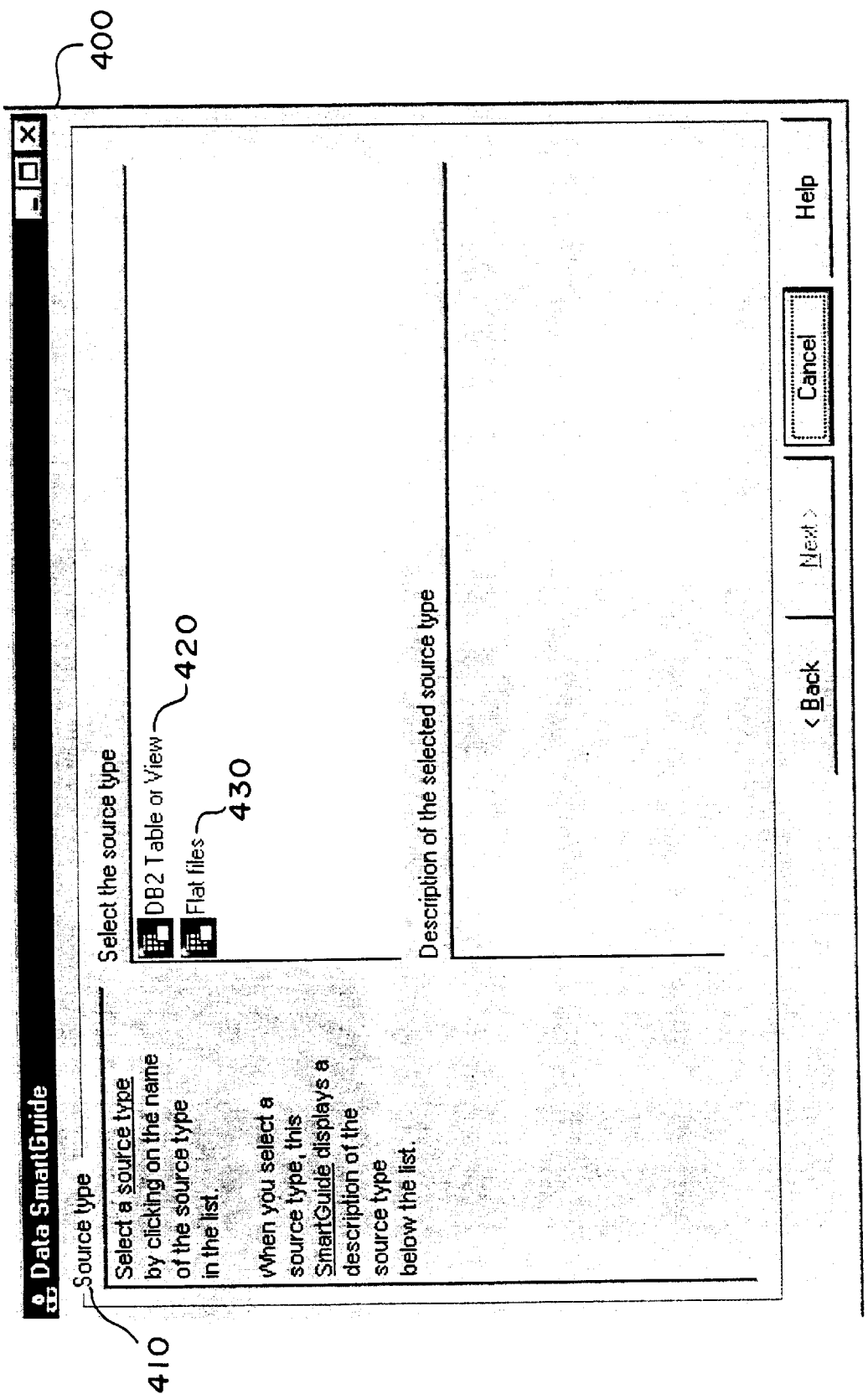
FIG. 4 illustrates a data source template for developing a data mining object.

FIG. 4 illustrates the third generic common GUI guide template. Please note that many additional panels, not specifically discussed herein, but fully described in the attached Appendix A, are selectively inserted between the generic common panels specifically illustrated in FIGS. 2–8. The specific additional panels are selected according to the inputs of the user while making selections to requested elements on previous panels. The third generic common template 400 requests the user to select a data source type 420 (DB2 table or view) or 430 (flat files). These are but two examples of data sources. Additional types, both local and imported, can be selected.

Figure 5:
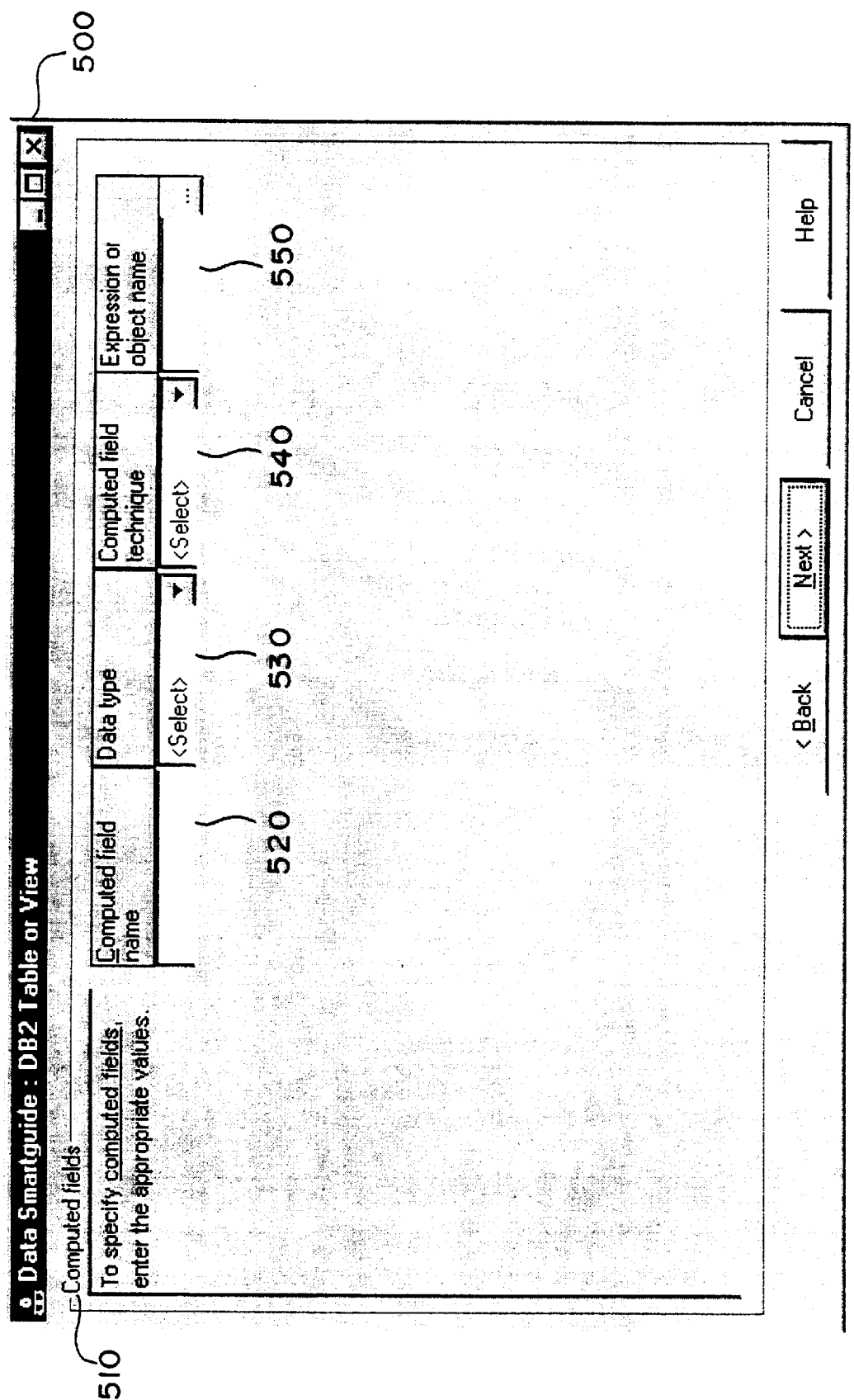
FIG. 5 illustrates a parameters, specifically computed fields, template for developing a data mining object.

FIG. 5 illustrates the fourth generic common GUI guide template, parameters/fields 500. Each object requires a plurality of data parameters or specific designation of selected fields. In the illustrated panel, computed fields 510 are being designated by the user. In box 520, a computed field name is selected from available selections or is created. In box 530, a data type is selected from available selections or is created. In box 540, a computed field technique is selected from available selections or is created. In box 550, the logical or mathematical expression is selected from available selections or is created. Specific parameter/fields are chosen based on the type of mining object and the related previous GUI template inputs.

Figure 6:
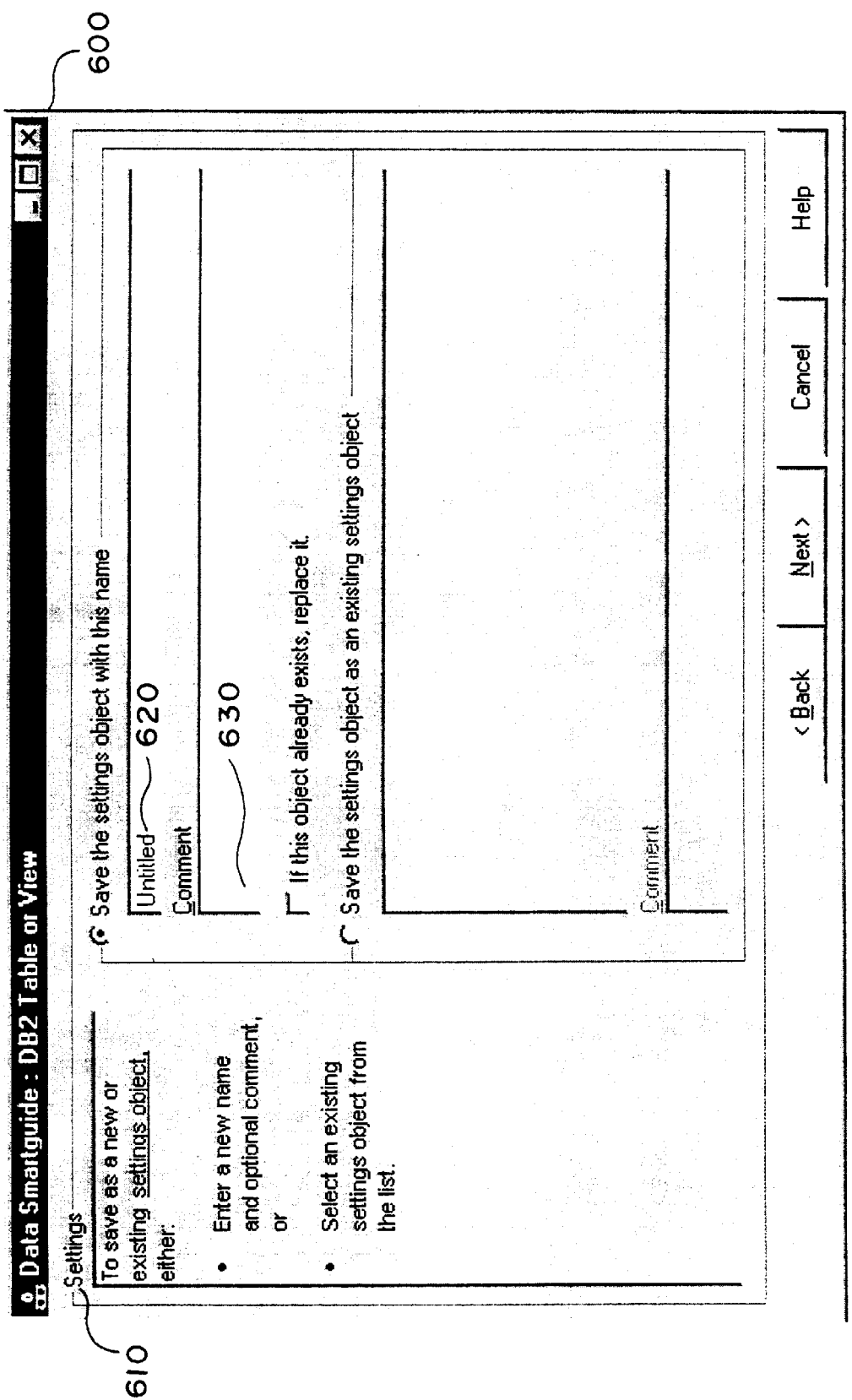
FIG. 6 illustrates a naming settings template for developing a data mining object.

FIG. 6 illustrates the fifth generic common GUI guide template, Naming 600. This template enables created object naming 620 and comments 630. Element 640 allows previous versions of similar named sub-objects to be updated or overwritten.

Figure 7:
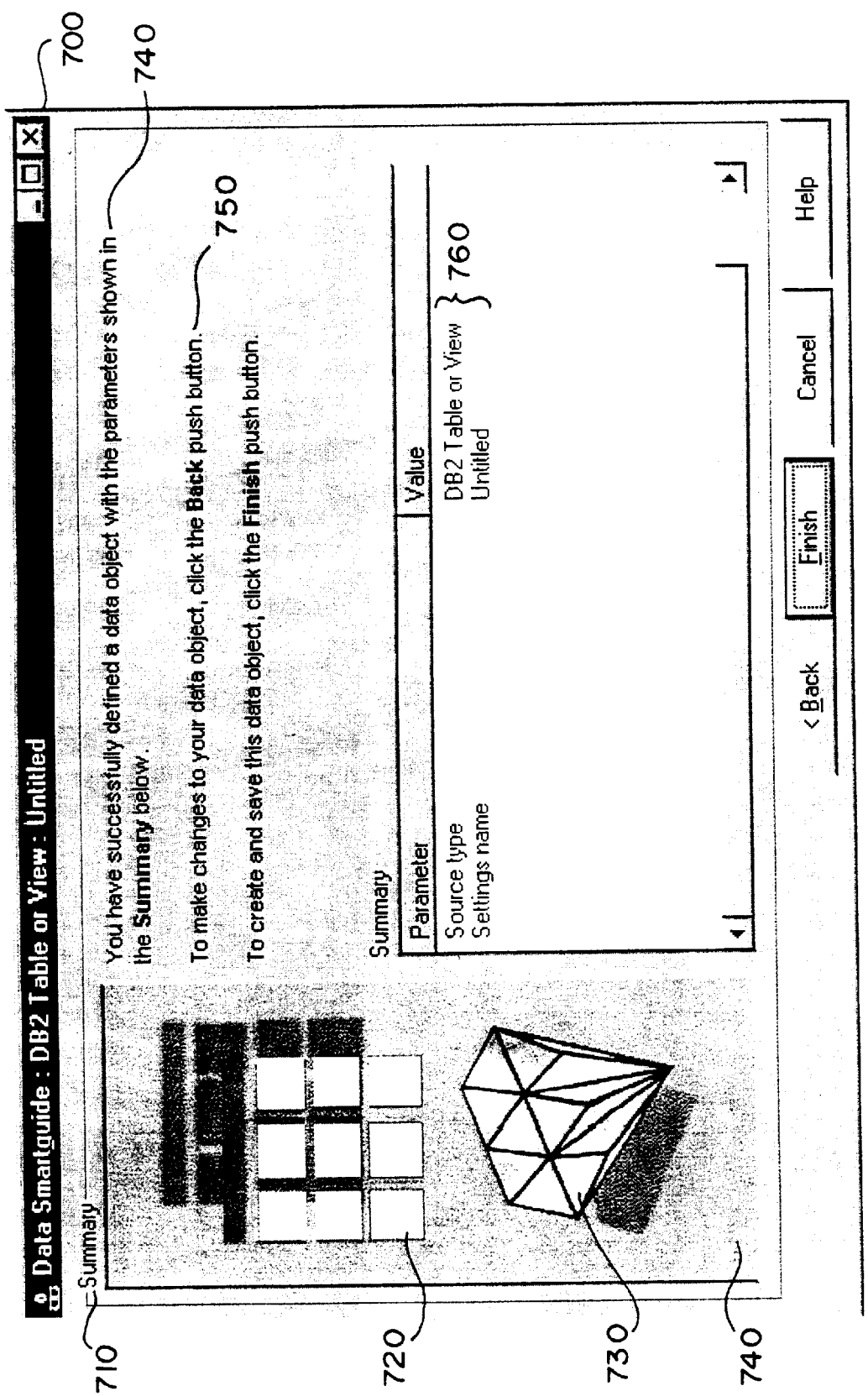
FIG. 7 illustrates a summary template for developing a data mining object.

FIG. 7 illustrates the sixth generic common GUI guide template, Summary 700. The Summary template concludes the development of a data mining object. Unique features of this panel are its persistence of color 740, icon 720 and graphic representation of the completion of the sub-object development process—diamond 730. The rough stone 270 of FIG. 2 has been transformed into a completed polished diamond 730. Further details of these elements may be found in the co-pending application entitled, "COLOR AND SYMBOL CODED VISUAL CUE FOR RELATING SCREEN MENU TO EXECUTED PROCESS." Element 740 reveals the completion of the development process. Element 750 enables backward sequencing to modify previous parameters. Element 760 reveals a summary of the previous template selections.

Figure 8:
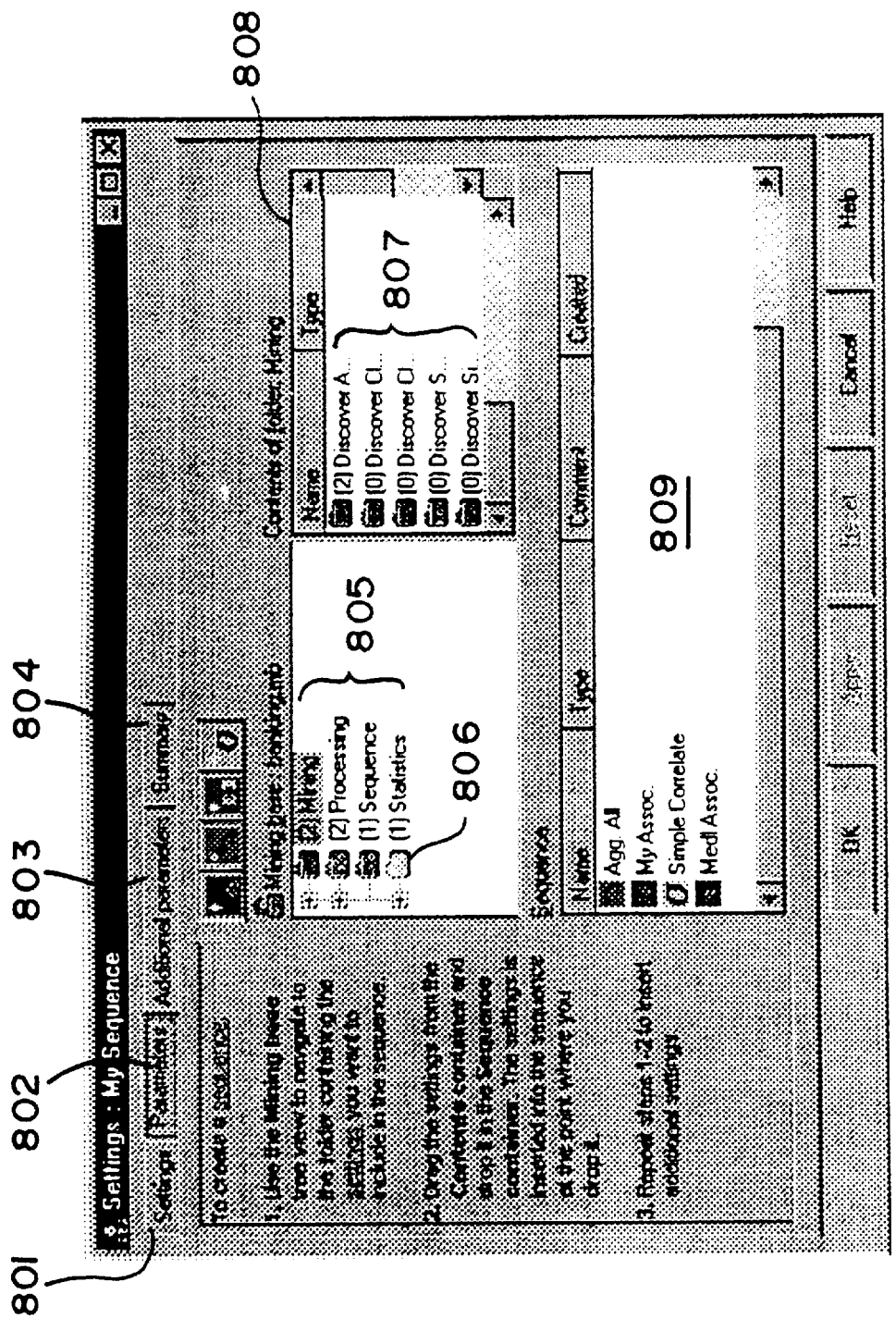
FIG. 8 illustrates the settings notebook GUI of the present invention.

FIG. 8 illustrates a graphical tabular 801–804 settings notebook to allow the user to modify selections made during the development process. The example shown in FIG. 9 relates to a sequence object but illustrates the general structure of the graphical notebook. A user can quickly review at a summary of the GUI templates traversed during creation of the selected object. The illustrated tabs include: settings 801, parameters 802, additional parameters 803 and summary 804. Selections made during the original object development may be modified through the graphical tabular notebook. A full discussion of this feature may be found in the co-pending application entitled, "METHOD FOR EDITING AN OBJECT WHEREIN STEPS FOR CREATING THE OBJECT ARE PRESERVED."

Once the user has established a plurality of data mining sub-objects, the sub-objects must be ordered in a sequence to create a data mining object(profile). The present invention provides a method of graphical ordering (sequence) of created sub-objects. FIG. 9 illustrates the welcome panel for creating a sequence object. The creation of the sequence object preserves selected sequence strategies for data mining. In addition the sequence object enables future integration into additional sequences and enables quick modification (i.e. by reordering the sequence, selection of different sub-objects or providing additional parameters) to adapt to variances in strategies.

Sequences contain settings that run consecutively. Sequences can contain Processing settings, Mining settings, Sequence settings and Statistic settings. The present invention Smartguide leads the user through the steps of: selecting the settings in the sequence, specifying parameters for the sequence and specifying the name of the sequence. FIG. 9b illustrates the creation of a standard sequence panel (previously shown in settings notebook example as shown in FIG. 8). To create a sequence the user navigates the mining base tree view 805 to select the folder 806 containing the settings desired to be inserted into the sequence. Next the user drags, using conventional drag and drop technology, the settings icons 807 from the contents container 808 and drops them into the sequence container 809. The settings is inserted into the sequence at the point where it was dropped. These steps are then repeated until the desired sequence is completed. Upon completion, the created sequence object is named and saved.

The sequence of objects in the sequence represents order of execution only and does not imply data flow. The sequence container behaves similarly to the workarea container described in the 1.5 Mining base (see Appendix A.) For example, the rules describing the context menus for objects in the workarea container also apply to the objects in the sequence container. One exception to this, the rules describing the context menus for the workarea container itself also apply to the sequence container itself. Also, objects can be dragged and dropped from the contents container (of this window only, i.e. drag and drop from any other container in any other window is not supported) into the sequence container. The sequence container differs from the workarea container in the main window in that the location of the cursor when the item is dropped has meaning. Specifically: 1. When an object is dropped to the left of the first item in the sequence (or anywhere if the sequence is empty), the object is inserted at the beginning of the sequence and all other object (if any) are moved down position in the sequence; 2. When an object is dropped below all other object in the sequence, the object is inserted at the end of the sequence; 3. When an object is dropped between two other objects or to the far right of any row of objects other than the last row, the dropped object is inserted between the two object in the sequence and all objects to the right of the inserted object are moved down one position in the sequence; 4. When an object is dropped on top of another object in the sequence, the object is inserted after that object in the sequence and all objects to the right of the inserted object are moved down one position in the sequence.

The context menu of the objects in the sequence include a checkable menu choice (Exclude) which excludes the running of the object when the sequence itself is run. When an object is excluded from the sequence, the object's graphic changes to a black and white bitmap to reflect this fact. The object remains excluded until reversed by user action, i.e. by unchecking the menu choice. When the user drags one or more settings from the contents container to the sequence container, and it is possible to determine that at least one of the dragged settings already exists in the sequence, then the cursor should change to a "no drop" cursor. If it is not possible to determine this information, then when the user attempts to drop the dragged settings into the sequence container, the system will check to make sure that none of the settings already exist in the container; if so, it will present a message to the user and cancel the drop. This check is made at all levels of nesting for both the dragged settings and the sequence settings being modified. The message reads "It is not possible to include more than one instance of a settings in a sequence." This restriction applies to all levels of nested sequences.

The present invention has greatly simplified the task of creating data mining objects. Each object can be created by traversing an intelligent sequence of GUI template guides. Furthermore, each object can be edited though the graphical tabular notebook which replicates the look and order of the templates encountered during creation. Upon creating a plurality of objects, a GUI template enables the creation of a sequence object comprising an ordered set of created objects thus preserving the order. The sequence object further enables future modification.

The above data mining GUI and its individually described elements are implemented in various computing environments. For example, the present invention may be implemented on a conventional IBM PC or equivalent, multi-nodal system (e.g. LAN) or networking system. All programming, mining algorithms, GUIs, display panels and dialog box templates, metadata and data related thereto are stored in computer memory, static or dynamic, and may be retrieved by the user of the Intelligent Mining system in any of: conventional computer storage, display (i.e. CRT) and/or hardcopy (i.e. printed) formats. The programming of the present invention may be implemented by one of skill in the art of object-oriented and/or statistical programming. For each algorithm there are parameters specific thereto.

CONCLUSION

A system and method has been shown in the above embodiments for the effective implementation of a GUI guide for data mining. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by a specific software/program, computing environment, specific computing hardware or GUI template configurations.

What is claimed is:

1. A computer-based graphical user interface used to develop an executable data mining profile comprising:
   a main menu interface listing data mining object types and sub-objects of each type, said data mining object types comprising one or more from the group of: data, discretization, mining, name mapping, processing, results, sequence, statistics and taxonomy;
   a dynamic series of context sensitive GUI templates, the selection of subsequent context sensitive templates based on one or more inputs to one or more proceeding GUI templates, said GUI templates extracting data object mining parameters from a user for one of said data mining object types, said data mining sub-object created by traversal of said series of GUI templates; and
   a sequence container retaining one or more a sequence data mining objects linking selected ones of said created sub-objects to create an executable data mining profile, said executable data mining profile comprising sequences of settings that run consecutively, said settings including one or more of processing, mining, sequence or statistics.

2. A computer-based graphical user interface used to develop a data mining profile as per claim 1, wherein said dynamic series of GUI templates comprises the sequence: introduction, selection of technique, selection of data source, selection of mining parameters, save and name, and summary.

3. A computer-based graphical user interface used to develop a data mining profile as per claim 1, wherein each of said templates in said dynamic GUI template sequence may comprise a plurality of related templates.

4. A computer-based graphical user interface used to develop a data mining profile as per claim 1, wherein said main menu comprises a plurality of windows, a first window displaying said listed data mining object types and sub-objects, a second window displaying sub-objects and a third window displaying a heterogenous selection of said sub-objects.

5. A computer-based graphical user interface used to develop a data mining profile as per claim 1, wherein a selection of said sequence object generates a GUI panel enabling graphical manipulation of sub-objects.

6. A computer-based graphical user interface used to develop a data mining profile as per claim 5, wherein said sub-objects are graphically ordered in various configurations creating variant data mining profiles.

7. A computer-based graphical user interface used to develop a data mining profile as per claim 1, wherein said executable objects create output objects.

8. A computer-based graphical user interface used to develop a data mining profile as per claim 7, wherein said output objects comprise tables.

9. A computer-based graphical user interface used to develop a data mining profile as per claim 1, wherein said context sensitive templates disclose both default and alterable parameter choices.

10. A computer-based graphical user interface used to develop a data mining profile as per claim 9, wherein subsequent context sensitive templates are presented based on the input parameters of the previous template.

11. A computer-based method of developing executable data mining objects comprising:

presenting a main menu interface listing one or more data mining object types and one or more sub-objects of each type, said data mining object types comprising one or more from the group of: data, discretization, mining, name mapping, processing, results, sequence, statistics and taxonomy;

presenting a series of context sensitive GUI templates, the selection of subsequent context sensitive templates based on one or more inputs to one or more proceeding GUI templates, said GUI templates each requesting a subset of mining parameters specific to a selected one of said one or more data mining object types;

guiding the development of said selected data mining sub-object by selective traversing through said series of GUI templates based on said mining parameters received by said requesting step; and grouping, by graphic manipulation, created mining sub-objects to create a said executable data mining profile, said executable data mining profile comprising sequences of settings that run consecutively, said settings including one or more of processing, mining, sequence or statistics.

12. A computer-based method of developing data mining objects as per claim 11, wherein said series of GUI templates comprise the sequence: introduction, selection of technique, selection of data source, selection of mining parameters, save and name, and summary.

13. A computer-based method of developing data mining objects as per claim 12, wherein each of said templates in said GUI template sequence may comprise a plurality of related templates.

14. A computer-based method of developing data mining objects as per claim 11, wherein said main menu comprises a plurality of windows, a first window displaying said listed data mining object types and sub-objects, a second window displaying sub-objects and a third window displaying a heterogenous selection of said sub-objects.

15. A computer-based method of developing data mining objects as per claim 11, wherein said executable objects create output objects.

16. A computer-based method of developing data mining objects as per claim 15, wherein said output objects comprise tables.

17. A computer-based method of developing data mining objects as per claim 1, wherein said context sensitive templates disclose both default and alterable parameter choices.

18. A computer-based method of developing data mining objects as per claim 1, wherein subsequent context sensitive templates are presented based on the input parameters of the previous panel.

19. A computer-based system used to develop executable data mining profiles comprising:

a main menu interface listing one or more data mining object types and associated sub-objects, said data mining object types comprising one or more from the group of: data, discretization, mining, name mapping, processing, results, sequence, statistics and taxonomy;

a series of context sensitive GUI templates, the selection of subsequent context sensitive templates based on one or more inputs to one or more proceeding GUI templates, said GUI templates requesting data object mining parameters for one of said data mining object types;

said data mining sub-objects created by traversal of said series of GUI templates based on data object mining parameters of a previous GUI template; and an executable data mining profile created by a selective grouping of created mining sub-objects, said executable data mining profile comprising sequences of settings that run consecutively, said settings including one or more of processing, mining, sequence or statistics.

20. A computer-based system used to develop data mining objects as per claim 19, wherein said series of GUI templates comprise the sequence: introduction, selection of technique, selection of data source, selection of mining parameters, save and name, and summary.

21. A computer-based system used to develop data mining objects as per claim 19, wherein each of said templates in said GUI template sequence may comprise a one or more related templates.

22. A computer-based system used to develop data mining objects as per claim 19, wherein said main menu comprises a plurality of windows, a first window displaying said listed data mining object types and additionally sub-objects, a second window displaying said sub-objects and a third window displaying a heterogenous selection of said sub-objects.

23. A computer-based system used to develop data mining objects as per claim 22, wherein said sub-objects are graphically ordered in various configurations creating variant data mining profiles.

24. A computer-based system used to develop data mining objects as per claim 19, wherein said executable objects create output objects.

25. A computer-based system used to develop data mining objects as per claim 24, wherein said output objects comprise tables.

26. A computer-based system used to develop data mining objects as per claim 2, wherein said context sensitive templates disclose both default and alterable parameter choices.

27. A computer-based system used to develop data mining objects as per claim 2, wherein subsequent context sensitive templates are presented based on the input parameters of the previous panel.

28. A computer program product for use with a graphics display device, said computer program product comprising:

a computer usable medium having computer readable program code means included in said medium:

said computer readable program code means embodying:

a main menu interface listing of one or more executable data mining object types, said executable data mining object types comprising one or more from the group of: data, discretization, mining, name mapping, processing, results, sequence, statistics and taxonomy;

sub-objects created by traversal of a series of GUI context-sensitive templates, said context sensitive templates based on one or more inputs to one or more proceeding GUI templates, said GUI templates requesting data object mining parameters for one or more of said data mining object types, and a graphical interface for linking said sub-objects in a selected order by creating an executable sequence object to preserve said selected order, said executable data mining sequence object comprising sequences of settings that run consecutively, said settings including one or more of processing, mining, sequence or statistics.

29. A computer-based method of developing data mining objects as per claim 28, wherein each data mining sub-object is created by user specification/selection of parameters, and wherein said sequence object enables a user to edit said parameters of linked sub-objects.

30. A computer-based method of developing data mining objects as per claim 29, wherein said sequence object enables detection of parameter dependencies during editing.

* * * * *

UNITED STATES PATENT AND TRADEMARK OFFICE
CERTIFICATE OF CORRECTION

PATENT NO.   : 6,108,004
DATED        : August 22, 2000
INVENTOR(S)  : Medl

Page 1 of 1

It is certified that error appears in the above-identified patent and that said Letters Patent is hereby corrected as shown below:

<u>Title page,</u>
ABSTRACT, line 5, after delete "settings" insert therefore -- Settings --.

<u>Column 4,</u>
Line 39, delete "is" insert therefore -- are --.

<u>Column 5,</u>
Line 5, delete "update" insert therefore -- updated --.

<u>Column 9,</u>
Line 7, after "collectively" insert therefore -- , --.
Line 64, delete "banking mining base" insert therefore -- "banking mining base" --.

<u>Column 12,</u>
Line 41, delete "Open with" insert therefore -- "Open with" --.

<u>Column 14,</u>
Line 48, delete "object(profile)" insert therefore -- object (profile) --.
Line 53, after "addition" insert therefore -- , --.

<u>Column 15,</u>
Lines 29 and 33, delete "object" insert therefore -- objects --.

<u>Column 16,</u>
Line 47, after "more" delete -- a --.

Signed and Sealed this

Twenty-fifth Day of December, 2001

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,108,004 | Page 1 of 1 |
| APPLICATION NO. | : 08/955402 | |
| DATED | : August 22, 2000 | |
| INVENTOR(S) | : Robert E. Medl | |

It is certified that error appears in the above-identified patent and that said Letters Patent is hereby corrected as shown below:

Column 1, line 2, insert --This application contains Appendix A submitted in micro-fiche form (3 slides).--.

Column 10, line 45, "list of visualizer" should read --list of visualizers--.

Figure 9A:
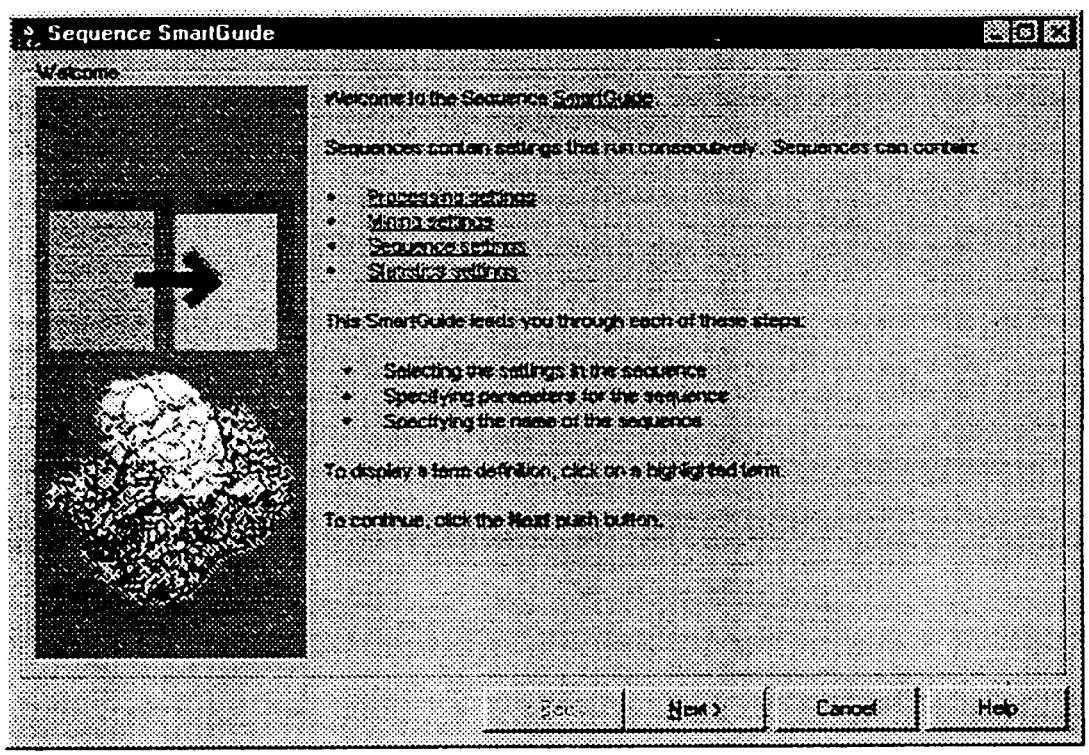
FIGS. 9a and 9b collectively illustrate the graphical interface for creating a sequence object.
Figure 9B:
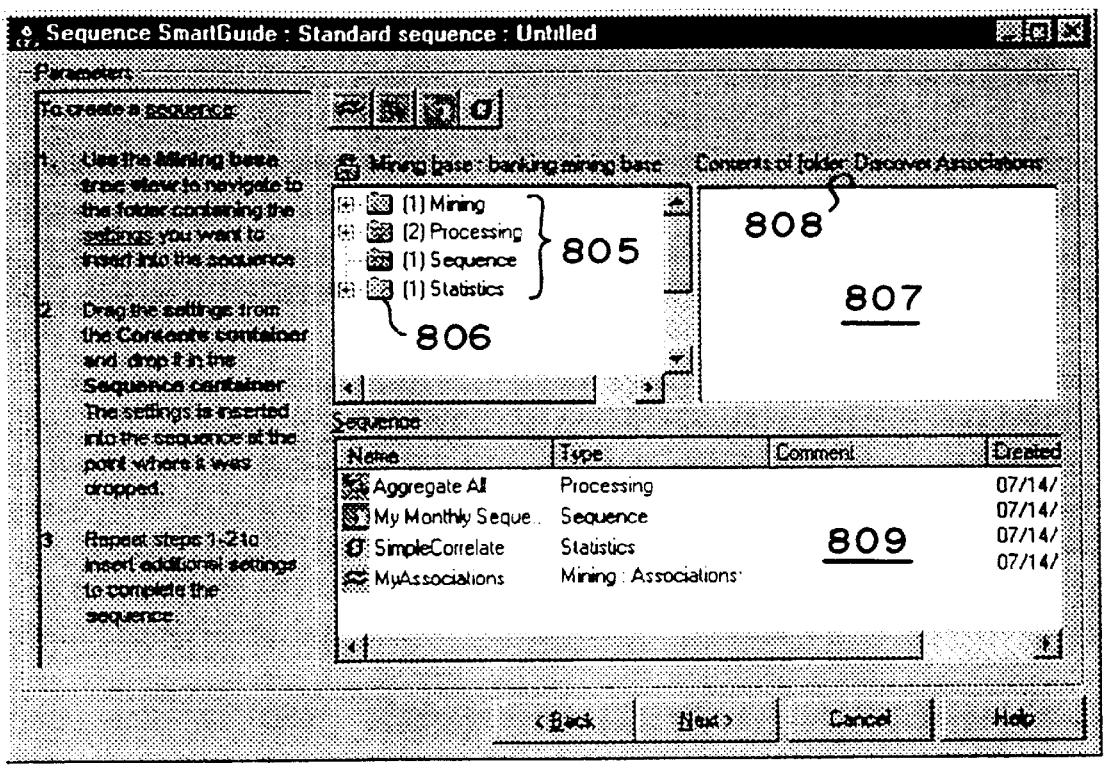

Column 14, line 49, "FIG. 9" should read --FIG. 9a--.

Claim 1, line 10 (Column 16, line 41), "proceeding" should read --preceding--.

Claim 11, line 11 (Column 17, line 36), "proceeding" should read --preceding--.

Claim 11, line 20 (Column 17, line 45), "create a said" should read --create an--.

Claim 19, line 10 (Column 18, line 20), "proceeding" should read --preceding--.

Claim 21, line 3 (Column 18, line 38), "comprise a one" should read --comprise one--.

Claim 28, line 16 (Column 19, line 12), "proceeding" should read --preceding--.

Signed and Sealed this

Fourth Day of November, 2008

JON W. DUDAS
*Director of the United States Patent and Trademark Office*